US006753351B2

(12) United States Patent
Clark et al.

(10) Patent No.: US 6,753,351 B2
(45) Date of Patent: *Jun. 22, 2004

(54) SUPPORTED CATALYST ACTIVATION

(75) Inventors: Janet Renee Clark, Baton Rouge, LA (US); Michel Daage, Baton Rouge, LA (US); Russell John Koveal, Baton Rouge, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 117 days.

This patent is subject to a terminal disclaimer.

(21) Appl. No.: 10/059,918

(22) Filed: Jan. 29, 2002

(65) Prior Publication Data

US 2003/0144130 A1 Jul. 31, 2003

(51) Int. Cl.[7] ............ C07C 27/00; B01J 20/34; B01J 23/40; B01J 23/72; C10G 15/00
(52) U.S. Cl. ........... 518/700; 518/713; 518/715; 518/709; 518/710; 502/38; 502/53; 502/54; 502/55; 502/326; 502/331; 208/208; 208/106
(58) Field of Search ............... 518/700, 709, 518/710, 713, 715; 502/38, 53, 54, 55, 226, 331, 326; 208/106

(56) References Cited

U.S. PATENT DOCUMENTS

| | | | |
|---|---|---|---|
| 2,369,956 A | 2/1945 | Feisst et al. ............ 260/449.6 |
| 2,542,558 A | 2/1951 | Naragon et al. ............ 252/416 |
| 3,661,798 A | 5/1972 | Cosyns et al. ............ 252/416 |
| 3,839,191 A | 10/1974 | Johnson ............ 208/108 |
| 4,088,671 A | 5/1978 | Kobylinski ............ 260/449.6 |
| 4,191,664 A | 3/1980 | McArthur ............ 252/466 |
| 4,492,744 A | 1/1985 | Brown et al. ............ 429/217 |
| 4,585,789 A | 4/1986 | Okamoto et al. ............ 514/461 |
| 4,605,679 A | 8/1986 | Kobylinski et al. ......... 518/700 |
| 4,670,414 A | 6/1987 | Kobylinski et al. ......... 502/174 |
| 4,814,066 A | 3/1989 | Fu ............ 208/120 |
| 4,929,336 A | 5/1990 | Lowery et al. ............ 208/120 |
| 4,954,244 A | 9/1990 | Fu et al. ............ 208/120 |
| 4,978,689 A | 12/1990 | Bell et al. ............ 518/709 |
| 5,292,705 A | 3/1994 | Mitchell ............ 502/325 |
| 5,495,055 A | 2/1996 | Rueter ............ 568/881 |
| 5,728,918 A | 3/1998 | Nay et al. ............ 585/733 |
| 6,103,184 A * | 8/2000 | Heck ............ 502/350 |
| 6,313,062 B1 | 11/2001 | Krylova et al. ............ 502/326 |
| 6,331,574 B1 * | 12/2001 | Lapidus et al. ............ 518/709 |

FOREIGN PATENT DOCUMENTS

| | | | |
|---|---|---|---|
| EP | 02 53 924 A1 | 7/1986 | ............ B01J/23/74 |
| EP | 0244014 A2 | 11/1987 | ............ B01J/38/64 |
| EP | 0244014 B1 | 11/1987 | ............ B01J/38/64 |
| EP | 0583837 B1 | 2/1994 | ............ B01J/37/00 |
| EP | 0583837 A1 | 2/1994 | ............ B01J/37/00 |
| EP | 0979673 A1 | 2/2000 | ............ B01J/37/02 |

OTHER PUBLICATIONS

A. Khodakov et al., "Structural Modification of Cobalt Catalysts: Effect of Wetting Studied by X–Ray and Infrared Techniques", *Oil & Gas Science and Technology*, Rev. IFP, vol. 54 (1999), No. 4. pp. 525–535.

* cited by examiner

*Primary Examiner*—J. Parsa
(74) *Attorney, Agent, or Firm*—Jay Simon; Mark D. Marin

(57) ABSTRACT

A process for activating a supported metal catalyst or catalyst precursor useful for the hydrogenation of carbon monoxide to form a mixture of hydrocarbons, comprising reducing with a hydrogen-containing gas at elevated temperature so that at least a portion is in the metallic state, impregnating under a non-oxidizing atmosphere with a solution of at least one member selected from the group consisting of ammonium salts, alkyl ammonium salts and weak organic acids, optionally further including ammonia, to the point where it has absorbed a volume of solution equal to at least about 10% of its calculated pore volume, oxidizing with a gaseous oxidant in the presence of the impregnating solution and reducing with hydrogen-containing gas at elevated temperatures to form an active catalyst. The steps beginning with the impregnation may be repeated. Optionally, the catalyst may be calcined after the oxidation step and/or passivated after activation.

19 Claims, No Drawings

SUPPORTED CATALYST ACTIVATION

RELATED APPLICATIONS

The assignee of this application is filing herewith the following applications Ser. No. 10/059,916 entitled "Fischer-Tropsch Catalyst Enhancement"; Ser. No. 10,059,917 entitled "Supported Catalyst Regeneration"; Ser. No. 10,059,928 entitled "Supported Catalyst Treatment"; Ser. No. 10/059,927 entitled "Catalyst Enhancement"; and Ser. No. 10/059,926 entitled "Catalyst Regeneration". Also, related in pending application Ser. No. 09/628,047, filed Aug. 1, 2000 entitled "Process for Increasing Cobalt Catalyst Hydrogenation Activity Via Aqueous Low Temperature Oxidation".

This invention relates to a process for the activation of supported Fischer-Tropsch catalysts that enhances their activity and/or selectivity in the production of higher hydrocarbons from synthesis gas.

BACKGROUND OF THE INVENTION

The conversion of synthesis gas, i.e. carbon monoxide and hydrogen, to higher value products is well known and has been in commercial use for many years. Typical processes include, for example, methanol syntheses, higher alcohol synthesis, hydroformylation and Fischer-Tropsch synthesis. The synthesis gas mixture is contacted with a suitable catalyst typically comprising at least one Group VIII metals. Suitable Fischer-Tropsch catalysts comprise one or more catalytic Group VIII metals, such as iron, cobalt and nickel. For oxygenate synthesis, copper may be included as well.

There exist many variations of the formulation and preparation of catalysts useful for the conversion of synthesis gas. In general, the catalysts are classified into two broad types, unsupported metals, known as Dispersed Active Metals and a larger groups of catalysts metals supported on refractory oxides, such as silica, alumina, titania or mixtures thereof. Such catalysts, whether supported or unsupported may be enhanced by the addition of other metals or metal oxides, known as promoter metals.

Supports for catalyst metals are generally pilled, pelleted, beaded, extruded, spray-dried or sieved materials. There are many methodologies reported in the literature for the preparation of supported catalyst metals. Examples of such techniques include incipient wetness impregnation, slurry impregnation, coprecipitation, and the like. It will be appreciated that high metal loadings are generally obtained by coprecipitation or multiple, i.e. two or three, impregnations, whereas low metal loading catalysts may be prepared utilizing a single impregnation. The catalyst metal content of such catalysts may vary from one to fifty weight percent. Promoter metals or metal oxides may be added during the impregnation steps using soluble salts of the respective metals such as Pt, Pd, Rh, Ru, Os, Ir, Mo, W, Cu, Si, Cr, Ti, Mg, Mn, Zr, Hf, Al, Th and the like.

It will further be appreciated that the choice of a particular metal combination and the amount thereof to be utilized will depend upon the specific application used in the conversion of synthesis gas. When a suitable support has been impregnated with one or more metals as by impregnation to form a catalyst precursor, it may be dried and then calcined in an oxygen-containing environment. The precursor is thereafter activated by reduction at elevated temperature in the presence of a reducing gas, typically containing hydrogen. Optionally, the catalyst is activated by contacting with hydrogen gas in presence of liquid hydrocarbons as disclosed in U.S. Pat. No. 5,292,705.

Regardless of the particular formulation and method of preparation, the method of activation, which may include a pretreatment, impacts the productivity and/or selectivity of the catalyst. Selectivity is generally expressed in terms of the percent of an undesirable substance in the product mix. For example, methane selectivity in a Fischer-Tropsch reaction is the percent of methane formed with the desired higher hydrocarbons. If productivity is often tied to a specific catalyst synthesis method or catalyst activation method, low productivity may also result from problems that may occur during the activation process itself. For example it is well known that the reduction of cobalt containing catalyst under conditions in which high partial pressure of water are obtained, lead to a poor catalyst activation and low catalyst productivity. In some cases, such poorly activated catalysts, which cannot be used at all, are discarded and then treated for metal recovery. It is obviously commercially significant to provide a method for the activation of catalyst that boosts the productivity and selectivity of catalysts, especially poorly activated catalysts, thereby avoiding the significant expense of their disposal.

Typically, metal containing catalysts are activated by treatment at elevated temperatures in presence of a reducing gas, for example a hydrogen-containing gas. In some specific applications such hydrogenation reactions for specialty chemicals, the metal component of the catalyst may be reduced at lower temperature using other reducing reagents such hydrazine or alkyl aluminum to maximize the metal dispersion or catalyst activity. Formation of a reduced catalyst may also be achieved by direct decomposition of metal salts, for example, thermal decomposition of oxalates. Carbon monoxide hydrogenation catalysts are commonly activated by means of high temperature reduction in presence of a hydrogen-containing gas. Typical procedures ensure a low partial pressure of water during the reduction by controlling the rate of reduction of the metal oxides. There are known pretreatment methods described in the literature.

U.S. Pat. Nos. 4,492,774; 4,595,798; 4,088,671; 4,605,679; and 4,670,414 and EP 0 253 924 disclose a method of activation of cobalt catalysts by means of a reduction/oxidation/reduction (R—O—R) cycle, resulting in an increase in activity for Fischer-Tropsch synthesis. To our knowledge, all the oxidation/reduction or reduction/oxidation/reduction cycles described in the above patents, were effected by treating a dry solid catalyst with an oxygen-containing gas at high temperature, resulting in the formation of the most stable oxide i.e., $Co_3O_4$. Several of these citations stressed the importance of controlling the exothermicity of the oxidation reaction and ensuring a low partial pressure of water during the reduction to avoid sintering of the cobalt particles, which may be detrimental to the activity of the final catalyst.

Khodakov et al. In a paper in Oil & Gas Science and Technology Rev. IFP, 54, 525 (1999) teach that contacting a reduced cobalt catalyst with water, followed by drying and calcining in air results in the formation of smaller cobalt oxide crystallites relative to those that would be formed by decomposition of the initial cobalt salts.

It is generally recognized that the economic worth of a given catalyst is a function of its original cost and its activity. It is apparent from the foregoing discussion that there has been considerable effort going back over many years to improve the economic worth of catalysts, since a process that will effectively increase the activity of a catalyst and/or extend the useful life will significantly improve the worth of that catalyst. Such a process is provided in accordance with the present invention.

SUMMARY OF THE INVENTION

In accordance with the present invention, catalytic activity and/or methane selectivity of supported Fischer-Tropsch metal catalysts or catalyst precursors are enhanced by a process comprising initially reducing with a hydrogen-containing gas at elevated temperatures to cause at least part of the metal therein to be in the metallic state, impregnating under a non-oxidizing atmosphere with a solution of at least one member selected from the group consisting of ammonium salts, alkyl ammonium salts and weak organic acids, optionally in combination with ammonia, oxidizing in the presence of the impregnating solution at low temperatures and reducing with a hydrogen-containing gas at elevated temperatures to activate the catalyst. Optionally, the supported catalyst precursor is calcined in the presence of an oxidant-containing atmosphere prior to activation. The activated catalyst may also be passivated to further enhance its properties.

DETAILED DESCRIPTION OF THE INVENTION

Supported metal catalysts, which correspond essentially to reduced metals formed by one of the recognized techniques discussed above onto a suitable support structure, typically a refractory inorganic oxide, such as titania, silica, silica-alumina, aluminum and the like, are utilized in a broad range of applications such as hydrogenation of hydrocarbons and carbon monoxide. Titania is a preferred support material for the catalyst metal substrates treated in accordance with the present invention. Start-up procedures for such reactions, which may include specific activation sequences, are highly dependent upon the catalytic reaction, the process design and, in particular, the reaction vessel design and configuration. The slurry bubble column reactor, is a preferred vessel for carrying out carbon monoxide hydrogenation reactions. The use of slurry bubble column for CO hydrogenation is particularly convenient in combination with the catalyst regeneration process of the present invention. In such reactors, the solid phase catalyst is dispersed or held in suspension in a liquid hydrocarbon phase by a gas phase, which continuously bubbles through the liquid phase. Supported catalysts useful for such applications contain at least 5 wt. %, preferably from 10 to 50 wt. %, of the catalyst metal in the reduced metallic form. Preferably, the catalyst comprises one or more of Co, Ni, Cu, Ru, Rh, Pd, Os, Ir, Re and Pt.

In the carbon monoxide hydrogenation reaction, syngas comprising a mixture of hydrogen and carbon monoxide is contacted with the catalyst thereby being converted into liquid and gaseous products, preferably $C_{10+}$ liquid hydrocarbons, with shifting or non-shifting conditions, preferably the latter, wherein little or no water gas shift takes place. This hydrocarbon synthesis ("HCS") process is generally carried out at temperatures of from about 160° C. to 260° C., pressures of from about 1 atm to about 100 atm, preferably from 10 atm to 40 atm, and gas space velocities of from about 100V/Hr/V to about 40,000V/Hr/V, preferably from about 1,000 V/Hr/V to about 15,000V/Hr/V. The expression "V/Hr/V" represents the standard volumes of gaseous carbon monoxide and hydrogen mixtures at 25° C. and 1 atm per hour per volume of catalyst, respectively. The molar ratio of hydrogen to carbon monoxide in the syngas feed is about 2.1:1 for the production of higher hydrocarbons. This ratio may vary to from about 1:1 to 4:1, and preferably is from about 1.8:1 to 2.2:1. These reaction conditions are well known and a particular set of reaction conditions can readily be determined from the parameters given herein. The hydrocarbon-containing products formed in the process are essentially free of sulfur and nitrogen-containing contaminants.

The hydrocarbons produced in a process as described above are typically upgraded to more valuable products by subjecting all or a portion of the $C_{5+}$ hydrocarbons to fractionation and/or conversion. By "conversion" is meant one or more operations in which the molecular structure of at least a portion of the hydrocarbon is changed and includes both non-catalytic processing, e.g. steam cracking, and catalytic processing, e.g. catalytic cracking, in which the portion, or fraction, is contacted with a suitable catalyst. If hydrogen is present as a reactant, such process steps are typically referred to as hydroconversion and variously as hydroisomerization, hydrocracking, hydrodewaxing, hydrorefining and the like. More rigorous hydrorefining is typically referred to as hydrotreating. These reactions are conducted under conditions well documented in the literature for the hydroconversion of hydrocarbon feeds, including hydrocarbon feeds rich in paraffins. Illustrative, but non-limiting, examples of more valuable products from such feeds by these processes include synthetic crude oil, liquid fuel, emulsions, purified olefins, solvents, monomers or polymers, lubricant oils, medicinal oils, waxy hydrocarbons, various nitrogen- or oxygen-containing products and the like. Examples of liquid fuels includes gasoline, diesel fuel and jet fuel, while lubricating oil includes automotive oil, jet oil, turbine oil and the like. Industrial oils include well drilling fluids, agricultural oils, heat transfer oils and the like.

In accordance with the present invention, significant enhancement in both the productivity and methane selectivity for Fischer-Tropsch synthesis is realized by impregnating a conventional supported Fischer-Tropsch catalyst in which at least part of the catalytic metal is in its reduced metallic state under a non-oxidizing atmosphere with a solution of at least one member selected from the group consisting of ammonium salts, alkyl ammonium salts and weak organic acids, optionally in combination with ammonia, oxidizing in the presence of the impregnating solution, and activating the catalyst by contact with a hydrogen-containing gas at elevated temperatures.

The process of the present invention is useful to enhance the properties of any catalyst, including those commercially available and is particularly useful for catalysts that, regardless of the source, have been poorly prepared or poorly reduced and, as a result, do not have the proper dispersion of metallic catalyst on the support. Such catalysts may generally be referred to herein as catalyst precursors which term also includes suitable supports that have been impregnated with one or more metals prior to activation. The term "catalyst" as utilized herein includes such precursors.

In accordance with the present invention, the catalyst is initially reduced to convert at least a portion thereof to its metallic state. This is carried out by contacting with a hydrogen-containing gas at elevated temperatures, i.e. from about 200° C. to 600° C., preferably from about 250° C. to 400° C. Typically, the hydrogen pressure for this treatment would be from atmospheric to about 100 atm, preferably from atmospheric to about 30 atm and gas hourly space velocities of from about 100 V/Hr/V to about 40,000 V/Hr/V, preferably from about 1,000 V/Hr/V to about 20,000 V/Hr/V, expressed as standard volumes of the gaseous carbon monoxide and hydrogen mixtures (25° C., 1 atm) per hour per volume of catalyst, respectively. Because of the metallic state of at least a portion of the catalyst after reduction, it is necessary to recover the catalyst under a non-oxidative atmosphere since some catalysts have a tendency to be pyrophoric. By non-oxidative is meant that the atmosphere need not be a pure inert gas, but may comprise an oxidative gas so long as no substantial oxidation of the catalyst takes place during the recovery thereof. One or a mixture of art-recognized non-oxidative gases, such as nitrogen, argon and the like may be utilized to create such atmosphere, with nitrogen being preferred.

In accordance with the present invention, the reduced catalyst is impregnated by contacting with a solution of at least one of a weak organic acid, an ammonium salt and an alkyl ammonium salt, optionally in combination with ammonia, and thereafter oxidized in the presence of the impregnating solution. The choice of solvent is dependent primarily on the capacity thereof to solubilize the ammonium salts, alkyl ammonium salts, or solubilize or be miscible with the weak organic acids as will be described below. The solvent is preferably water, however, other solvents, e.g. certain organic solvents, may be combined therewith provided that they are miscible with water and do not introduce any known catalytic poison. Mixtures of water and immiscible organic solvents can be utilized as well as mixtures of water with solvents in combination with suitable dispersing or emulsifying agents present to form a continuous phase, i.e. an emulsion. Such other suitable liquids include hydrocarbons, particularly those derived from the Fischer-Tropsch synthesis, dense fluids, for example, supercritical fluids such as liquid phase light hydrocarbons, i.e. $C_{3-5}$, alkanes, cyclopentane and the like. Preferred mixed liquids include, without any intended limitation, water/lower alkanols, water/Fischer-Tropsch products, and water/alkanols/alkanes.

The weak organic acids, ammonium salts or alkyl ammonium salts utilized in the impregnating solution are preferably those that are easily removable from the catalyst without the deposition of any material that might have a deleterious effect on the performance of the catalyst. Examples of the latter would be materials containing halogens, sulfur, phosphorus and the like.

By alkyl ammonium salts, we include mono-, di-, tri- and tetra-alkyl ammonium salts or any mixture thereof. In a non-limiting preferred embodiment, combinations of the salts with ammonia are utilized and the concentration of ammonia in the solution does not exceed about five moles per liter. Suitable weak organic acids for the subject process are carboxylic acids having the general formula R—(COOH)$_n$ wherein n is 1–3 and R represents a cyclic or aliphatic, saturated or unsaturated moiety that may be substituted with one or more nitro, amino, hydroxyl or alkoxyl groups. Specific examples of suitable acids include, without intended limitation, formic acid, acetic acid, citric acid, succinic acid, malonic acid, propionic acid, butyric acid, valeric acid, caproic acid, glutaric acid, adipic acid, lactic acid, benzoic acid, phthalic acid, salicylic acid, ascorbic acid, oxalic acid and the like. Suitable ammonium or alkyl ammonium salts include, without intended limitation, the nitrate, cyanide, carbonate, and carboxylates. The term "carboxylates" as utilized herein includes salts of the weak organic acids as defined above. Preferred examples of suitable acids and salts include, without intended limitation, acetic acid, citric acid, ammonium acetate and ammonium nitrate. While combinations of more than one of these acids or ammonium salts or alkyl ammonium salts could be utilized, in general it is preferred to utilize them individually.

The concentration of each of the constituents of the impregnating solution will depend on a number of factors including the solubility or miscibility of the weak acid, salt or salts, the volume of liquid utilized, the metal loading of the catalyst and the like. Optionally, the impregnating solution also contains ammonia in an amount up to twice the molecular equivalent of the at least one salt, said amount in any event not exceeding about five moles per liter of the impregnating solution. In general, the impregnating solution will contain from about 1% to about 30%, preferably from about 5% to about 15%, by weight of the ammonium or alkyl ammonium salt, and up to about 5 moles per liter of ammonia. In a preferred embodiment having ammonia present, the concentration thereof is chosen according to the following equation:

$$[NH_3]/(n^-[(NH_4^+)_n X]) \leq 1$$

wherein X is the anion of the salt, n is the charge of the anion of the salt and the bracketed expressions are concentrations in moles per liter of the impregnating solution.

The amount of the weak acid, ammonium salt or alkyl ammonium salt present, under any conditions, is less than the amount that would be required to convert all of the catalyst metals present to their corresponding salts. The impregnating solution of the ammonium or alkyl ammonium salt or salts may be prepared by simply dissolving it in the selected solvent, or by combining solution of suitable reactants that will form it in-situ, e.g. acetic acid and aqua ammonia to obtain an ammonium acetate solution.

The impregnation will typically be carried out until the supported catalyst substrate has absorbed a volume of impregnating solution equal to at least about 10% of its calculated pore volume, preferably to where conditions of incipient wetness are attained. By incipient wetness is meant that the substrate catalyst has adsorbed an amount of solution generally equivalent to its calculated pore volume. Pore volume is a discernible quantity that can be measured directly or indirectly by known techniques such as porosimetry. The volume of impregnating solution contemplated will vary from 10% to 1,000% of the calculated pore volume of the catalyst. Preferably, the volume of treatment solution will be from 30% to 200%, most preferably from about 70% to 100% of the calculated pore volume of the catalyst.

The impregnating solution will remain in contact with the catalyst for from 1 minute to 24 hours, preferably from about 5 to 120 minutes. The time required for the treatment will vary depending on factors such as the metal loading of the catalyst being treated, the quantity thereof, the composition and volume of the impregnating solution, the reactor configuration and the like. The treatment is carried out at a temperature from about 0° C. to about 100° C., preferably from room temperature, i.e. 20°–25° C., to about 80° C. The pressure is not particularly critical and can be from 0.1 to 100 atmospheres, with atmospheric pressure being preferred. It is important, however, that the impregnation be carried out under a non-oxidative atmosphere as defined above, preferably an inert atmosphere.

Once the reduced, supported catalyst has absorbed the desired volume of impregnating solution, it undergoes oxidation in the presence of the impregnating solution. It has been found in accordance with the present invention that the oxidation of the catalyst is significantly enhanced by the presence of the constituents of the impregnating solution. Without wishing to be bound by any particular theory, it is believed that the presence of the weak acid, ammonium or alkyl ammonium salt or salts allows the formation of and enhances the solubility of complexes of the catalyst metal, e.g. $Co^{2+}$ or $Co^{3+}$. The presence of ammonia promotes the formation of such complexes as well. The action of the weak acid, ammonium salt, alkyl ammonium salt or mixtures thereof in enhancing the solubility of the complexes promotes their distribution within the pores of the catalyst surface. This dispersing, or re-dispersing, of the catalyst metal enhances the properties of the catalyst upon activation as will be described below.

The oxidation of the catalyst is carried out by contacting with an oxidant-containing gas. As discussed above, the ammonium salt, alkyl ammonium salt or mixtures of one or more of such salts may be itself an oxidant, e.g. ammonium nitrate. Although such an ammonium salt or alkyl ammonium salt will produce some oxidation of the catalyst metal during the impregnation, the desired level of oxidation may not occur until the oxidant gas is brought into contact with it. The oxidant gas may be oxygen, air, ozone, nitrogen oxides or other gaseous oxidant, with air or a mixture of oxygen and an inert gas being preferred. Generally, the concentration of the oxidant, preferably oxygen, in the oxidant gas will be between 10 ppm and 21 vol %, preferably between 1% and 21 vol % by volume. Typically, the treatment gas pressure would be from about 0.1 atm to about 100 atm, preferably atmospheric to about 10 atm, and the gas hourly space velocities would be from about 10 V/Hr/V to about 10,000 V/Hr/V, preferably from about 100 V/Hr/V to about 1,000 V/Hr/V, expressed as standard volumes of the gas or gas mixtures (25° C., 1 atm) per hour per volume of catalyst, respectively.

The oxidation is typically exothermic and care must be taken to maintain the temperature below about 100° C., preferably below about 80° C. This is generally carried out by adjusting the concentration of the oxidant in the treatment gas to thereby prevent significant evaporation of the impregnating solution. A gradual increase in the oxidant concentration in the treatment gas has been found to provide an effective means of controlling the exotherm. Optionally, incremental replacement of the impregnating solution may be carried out during the oxidation. This serves the dual purpose of preventing the catalyst from drying out and aiding in controlling the exotherm through the cooling effect of evaporation. The use of an oxygen-containing gas in combination with an oxidant salt as the ammonium salt, e.g. ammonium nitrate, is particularly effective in the oxidation of the catalyst.

The oxidation step is generally carried out until a discernible change takes place in the catalyst and/or the reaction environment. Changes in the catalyst will include changes in color. Changes in the reaction atmosphere will include a cessation of the evolution of ammonia and/or the diminishing of the exotherm. This generally will require from about 1 to 120 minutes. Once the oxidation is concluded, the catalyst particles are preferably dried, typically at a temperature of from about 50° C. to 150° C., optionally with a gas sweep.

The treated catalyst particles are activated by reduction with a hydrogen-containing gas at elevated temperatures, i.e. from about 200° C. to 600° C., preferably from about 250° C. to 400° C. Hydrogen partial pressure during the reduction would range from about 1 to 100 atmospheres, preferably from about 1 to 40 atmospheres, and the gas hourly space velocities would be from about 100 V/Hr/V to about 40,000 V/Hr/V, preferably from about 1,000 V/Hr/V to about 20,000 V/Hr/V, expressed as standard volumes of the gas or gas mixtures (25° C., 1 atm) per hour per volume of catalyst, respectively. The resulting supported catalyst particles enhanced in accordance with the present invention have been found to have a significant portion of their original activity restored, both in terms of production of the desired hydrocarbons and in methane selectivity. However, if it is decided for whatever reason that the activity of the catalyst is not sufficiently enhanced, the foregoing steps may be repeated, beginning with the impregnation step.

As an optional step in the subject process, the supported catalyst described above is calcined under an oxidant-containing atmosphere prior to the activation step. The atmosphere is preferably air, but may be an inert atmosphere containing a controlled amount of oxygen, e.g. such as would be produced as a product gas stream or a waste gas stream from an air separation plant. Such controlled oxidant-containing atmospheres would contain from 10 ppm to 21% by volume, preferably from about 1% to 21% by volume, oxygen with the remainder being a non-oxidative gas, preferably an inert gas, such as nitrogen. The gas flow in the furnace is from about 100 to 10,000, preferably from about 1,000 to 5,000 GSHV. The calcination is carried out at elevated temperatures, i.e. from about 150° C. to about 600° C., preferably from about 200° C. to 450° C., for from about 1 to 8 hours, preferably from 1 to about 4 hours. Suitable apparatus for the calcining step may be a rotary calciner such as described in Perry's chemical Engineer's Handbook, Seventh Edition, Chapter 12, McGraw-Hill, N.Y. (1997), a fluidized processor as will be described below, or an HCS reactor itself.

It is a further optional step within the scope of the present invention to passivate the treated catalyst after the activation with a hydrogen-containing gas has been carried out. The passivation may be carried out by contacting the catalyst with a gas containing carbon monoxide, or carbon monoxide and hydrogen, under conditions such that carbon monoxide does not significantly decompose and is not hydrogenated to a material degree. Such conditions, for example, would be a temperature below about 150° C., preferably between about 25° C. and 100° C., and pressure below about 20 atm, particularly between about 1 and 10 atm and the gas hourly space velocities would be from about 1 V/Hr/V to about 1,000 V/Hr/V, preferably from about 10 V/Hr/V to about 500 V/Hr/V, expressed as standard volumes of the gas or gas mixtures (25° C., 1 atm) per hour per volume of catalyst, respectively. It will be appreciated that some decomposition or hydrogenation, respectively, of the carbon monoxide may take place regardless of the precautions taken by the operator. However, it has been found that, typically, significant decomposition/hydrogenation will not take place wherein the concentration of carbon monoxide or carbon monoxide and hydrogen in the feed gas does not exceed about 5% by volume. Other passivating agents include, for example, traces of oxygen or carbon dioxide.

The treatment process in accordance with the present invention may be carried out in a series of apparatus particularly adapted to a specific step or steps, but preferably is carried out in a single processor device that can impart mixing and fluidization to the process. It would be configured to enhance heat transfer, mixing liquid-contacting, and gas solid transfer. Examples of suitable processors are gas fluidized beds, vibro-fluidized beds, mechanical blenders, e.g. double cone, vee, ribbon and the like and mixers such as plow, planetary, paddle and the like. These devices fluidize the processed material by passing a gas directly through it, by mechanical agitation or by a combination of both actions. Processing in such a device causes the material being treated to attain fluid-like properties resulting in intimate contact between each particle and the gas stream thus creating an extremely efficient mass and heat transfer. A device that provides at least mechanical fluidization is particularly preferred since, although both a slurry and a powder can be made to readily flow, during the drying process from one to the other, the material will pass through what is termed the "mud stage" where it is extremely difficult to fluidize. Hence, if the amount of solution utilized for the impregnation treatment is such that the material approaches or achieves the mud stage, a processor should have at least mechanical and, preferably, both mechanical and gas fluidization.

A preferred processor for carrying out the subject process is the plow mixer, a device with a jacketed horizontal cylinder with an axial agitator shaft containing several sets of blade or triangular agitators. Such a device will typically also have both gas and liquid inlets and outlets as well as an inlet and outlet for the solid material being processed. While this is a preferred device, any comparable mixer possessing the foregoing capabilities could be utilized as well provided that it has the capacity to fluidize the material from the mud stage to a dry, flowable material. Such a device will also facilitate the subsequent contact with hydrogen containing gas at elevated temperatures. A mechanical mixer, such as a plow mixer, is advantageous in that the liquid may be added while the material is in a fluidized condition. Because the mixer has inlet and outlet means for gas, when the material has been impregnated to the desired degree, the subsequent oxidation with a gaseous oxidant may be affected therein as well. At the completion of the low temperature oxidation step, as indicated by the cessation of the exotherm, the material may remain if the processor, or may be removed for further processing, for example, drying and calcination steps discussed above. All of these operations may be carried out in the processor if desired.

The final activation of the material to form an active catalyst can be carried out in a fluidized processor as described above. A larger variety of devices may be utilized for this step, however, since the material does not pass through a mud phase, hence gas fluidizers can be utilized for the excellent solid-gas contact they provide. For the same reason, a gas fluidizer may be utilized for the optional passivation step described above as, again, the material does not transcend through a mud phase. It can be appreciated, that a series of varied devices can be utilized to carry out the process of the present invention, which may be advantageous for large-scale operations. However, as described above, it is also possible to carry out the entire process of activation of the supported catalyst in a mechanical fluidizer having the capabilities of solid, gas and liquid transfer.

It is understood that various other embodiments and modifications in the practice of the invention will be apparent to, and can be readily made by, those of ordinary skill in the art without departing form the scope and spirit of the invention as described above. Accordingly, it is not intended that the scope of the claims appended hereto be limited to the exact description set forth above, but rather that the claims be construed as encompassing all of the features of patentable novelty that reside in the present invention, including all the features and embodiments that would be treated as equivalents thereof by those skilled in the art to which the invention pertains. The invention is further described with reference to the following experimental work.

EXAMPLE 1

Preparation of Hcs Catalyst with 18.5% Cobalt Loading 20.0 Grams of a rutile titania support ($H_2O$ pore volume: 0.34 ml/g) were impregnated with 11.29 g of an aqueous solution of cobalt nitrate and perrhenic acid (74.0 wt % $Co(NO_3)_2 \cdot 6H_2O$; 1.77% $HReO_4$). The catalyst was dried in air for two hours at 120° C. and calcined in air for three hours at 350° C. with a ramp rate of 5° C./min. A dark gray powder resulted (22.50 g). A second impregnation was performed on the entire sample by addition of 10.21 g of the solution to the calcined sample. The catalyst was dried in air for two hours at 120° C. and calcined in air for three hours at 350° C. with a ramp rate of 5° C. A third impregnation was performed on the sample by addition of 9.36 g of the solution. The catalyst was dried in air for two hours at 120° C. and calcined in air for three hours at 350° C. with a ramp rate of 5° C. A dark gray catalyst resulted which contained 18.5 wt % Co and 1.6 wt % Re. Oxygen chemisorption was performed on the reduced catalyst: 474 $\mu$mol $O_2$/g catalyst were adsorbed, corresponding to 0.30 oxygen per Co atom.

EXAMPLE 2

Activation of Hcs Catalyst from Example 1 by Aqua Ammonia/Ammonium

Acetate Assisted Aqueous Low Temperature Air Oxidation 11.0 Grams of the catalyst prepared in Example 1 was charged to a fixed bed reactor. The catalyst was reduced under a flow of hydrogen (500 cc/min) at 375° C. for two hours. The reactor was cooled under the same flow of hydrogen and the gas was replaced with nitrogen. After cooling to room temperature, the catalyst was discharged under a nitrogen atmosphere. 10.07 Grams of reduced catalyst resulted 2.20 Grams of aqueous $NH_4OAc/NH_3$ solution (2.4 M $NH_4OAc$; 3.0 M $NH_3$) was added to the reduced catalyst under inert conditions. A free flowing powder resulted. The sample was exposed to air and rapidly stirred for 20 minutes. During this time, an exotherm occurred and a blue/green tint was apparent. After the 20 minutes, the sample had returned to room temperature. The sample was then dried in air for two hours at 120° C. and calcined in air for three hours at 350° C. with a ramp rate of 5° C./min. 10.52 g of a dark gray powder resulted. Oxygen chemisorption was performed on the reduced catalyst: 821 $\mu$mol $O_2$/g catalyst were adsorbed, corresponding to 0.52 oxygen per Co atom. This example demonstrates that the dispersion of a cobalt catalyst is enhanced by aqua ammonia/ammonium acetate assisted aqueous low temperature air oxidation

EXAMPLE 3

Preparation of 12.8% $Co/TiO_2$ 20.0 Grams of titania support (pore volume: 0.34 ml/g) were impregnated to incipient wetness with 10.10 g of an aqueous solution of cobalt nitrate and perrhenic acid (73.2 wt % $Co(NO_3)_2 \cdot 6H_2O$; 1.75% $HReO_4$). The impregnated catalyst was dried in air for two hours at 120° C. and calcined in air for three hours at 350° C. with a ramp rate of 5° C. to yield 22.19 g of a dark gray powder. A second incipient wetness impregnation (9.01 g of solution) was performed on 20.19 g of the calcined sample. The impregnated catalyst was dried in air for two hours at 120° C. and calcined in air for three hours at 350° C. with a ramp rate of 5° C. The resulting catalyst (22.09 g) contained 12.8 wt % Co and 1.1 wt % Re. Oxygen chemisorption was performed on the resultant catalyst after reduction with hydrogen 358 $\mu$mol $O_2$/g catalyst were absorbed, corresponding to 0.33 oxygen per Co atom.

EXAMPLE 4

Testing of Catalyst from Example 3

A Fischer-Tropsch synthesis was carried out in a fixed bed reactor. Approximately 1.9 g (1.3 cc) of catalyst prepared in Example 3 were mixed with 7.7 cc of quartz diluent charged to a 0.375" diameter tubular reactor. The catalyst bed was held in place with a plug of glass wool. A multi-point thermocouple was inserted into the catalyst bed to monitor temperatures. The catalyst was reduced with hydrogen at 375° C. and 280 psig with 475 sccm hydrogen and 25 sccm argon for two hours. The catalyst was then cooled to 93° C. under the same flow of $H_2$/Ar. After cooling, the feed gas composition was changed to 100.3 sccm $H_2$, 5.4 sccm Ar, 47.8 sccm CO and 2.6 sccm $N_2$ giving a $H_2$/CO ratio of 2.1 and GHSV of 7200. Pressure was held at 280 psig. The temperature was ramped to 198° C. and held for 24 hours before ramping to a run temperature of 213° C. These conditions were maintained for the remainder of the test. After reaching 213° C., the CO conversion was 52.4% and the methane selectivity was 6.2%. After 1 day at this condition, the CO conversion was 50% and the methane selectivity was 6.1%. Methane selectivity is defined as the carbon corresponding to methane in the product as a fraction of the total carbon converted from CO.

EXAMPLE 5

Activation of Catalyst from Example 3 by Aqua Ammonia/Ammonium

Acetate Assisted Aqueous Low Temperature Air Oxidation of Catalyst 11.0 Grams of the catalyst prepared in Example 3 was charged to a fixed bed reactor. The catalyst was reduced under a flow of hydrogen (450 cc/min) at 375° C. for three hours. The reactor was cooled under the same flow of hydrogen and the gas was replaced with nitrogen. After cooling to room temperature, the catalyst was discharged under a nitrogen atmosphere to yield 10.179 g of reduced catalyst. 2.55 Grams of $NH_4OAc/NH_3$ solution (2.4 M $NH_4OAc$; 3.0 M $NH_3$) was added to 10.18 g of the reduced catalyst under inert conditions. A free flowing powder resulted. The sample was exposed to air and rapidly stirred for 20 minutes. During this time, an exotherm occurred and the catalyst color turned from dark gray to Prussian green. After 20 minutes, the sample had returned to room temperature and the sample was left to sit in air for 4 h. The sample was then dried in air for two hours at 120° C. and calcined in air for three hours at 350° C. with a ramp rate of 5° C./min. 10.58 Grams of a dark gray powder resulted. The oxygen chemisorption was 623 μmol $O_2$/g of catalyst, corresponding to 0.57 oxygen per Co atom.

The catalyst was tested according to the procedure described in example 4. After reaching 213° C., the CO conversion was 80.2% and the methane selectivity was 6.2%. After 1 day at this condition, the CO conversion was 79.5% and the methane selectivity was 6.0%.

Both the chemisorption and the catalytic test demonstrate that the metal dispersion of the catalyst and its activity has been significantly enhanced by aqua ammonia/ammonium acetate assisted aqueous low temperature air oxidation

EXAMPLE 6

Preparation and Testing of Sintered Co/Tio$_2$ Catalyst

A catalyst prepared according to Example 1 was first reduced in a fluidized bed vessel at 280° C., 56 psig, 1320 GHSV, which resulted in a high water partial pressure transient. A sample of catalyst was removed from the activation vessel without exposure to air and, in a glove bag purged with argon, mixed with 7 parts by volume of titania diluent. Approximately 2.4 cc of this catalyst/diluent mixture was charged to a tubular reactor (0.25" internal diameter) under these air-free conditions. The reduced catalyst was tested directly, without further reduction, with 2:1 H2/CO at 190° C., 280 psig, 3000 GHSV. After increasing temperature to 200° C., 11% CO conversion was obtained with a methane selectivity of 5.2%. For comparison, a sample of the same catalyst precursor was reduced in the tubular reactor under conditions avoiding the high water partial pressure transient (350° C., 1 atm $H_2$, 20,000 GHSV). At 200° C., 74% CO conversion was obtained with 4.7% methane selectivity. These results show the impact of a poor catalyst activation, which resulted in a low dispersion of the cobalt.

EXAMPLE 7

Reduction of Sintered Co/Tio$_2$ Catalyst 10.82 grams of a sintered metal catalyst (Example 6) was charged to a fixed bed reactor. The reactor was purged with a flow of nitrogen for 15 minutes then the gas was replaced with pure hydrogen. The reactor was purged for 15 minutes and then the flow rate established at 450 sccm. The reactor temperature was ramped to 425° C. and held for three hours under said flow to reduce the metal components. The reactor was cooled under the same flow of hydrogen and the gas was replaced by nitrogen when the temperature dropped below 100° C. After completion of cooling down to room temperature, the catalyst was discharged under a nitrogen atmosphere. 10.30 Grams of sample were recovered as reduced catalyst

EXAMPLE 8

Activation of Sintered Co/Tio$_2$ Catalyst by Air Calcination

Approximately 1.9 grams (1.3 cc) of catalyst from Example 7 was mixed with 7.7 cc of a quartz diluent and charged to a 0.375" diameter tubular reactor. The catalyst bed was held in place with a plug of glass wool. A multi-point thermocouple was inserted into the catalyst bed to monitor temperatures. At 10 psig pressure, the reactor was purged with nitrogen at room temperature for 15 minutes. Then a blend of 5% oxygen in argon was introduced at 100 sccm. The temperature was raised to 250° C. by ramping to 100° C. and holding for 1 hour, then increasing in 50° C. increments and holding for 1 hour each until reaching 250° C. The reactor was held at 250° C. and 10 psig under 100 sccm of the oxygen/argon blend for 16 hours at which time temperature was increased to 300° C. and held for 0.5 hours and increased to 350° C. for 1 hour. The reactor was then cooled to room temperature under the oxygen/argon blend and then purged with nitrogen.

The catalyst was then reduced with hydrogen at 390° C. and tested according to Example 4. After reaching 213° C., the CO conversion was 23.6% and the methane selectivity was 5.7%. After 1 day at this condition, the CO conversion was 22.4% and the methane selectivity was 5.7%. This example shows that the activity of the sintered catalyst can be enhanced by air calcination.

EXAMPLE 9

Activation of Catalyst from Example 7 by Water-Assisted

Aqueous Low Temperature Air Oxidation 1.16 Grams of deionized water were added to 5.12 grams of the catalyst from Example 5 under inert conditions. The sample was then placed under an air atmosphere and mixed vigorously for 15 minutes. A mild exotherm occurred which subsided after several minutes. After an additional 2 hours in air, the sample was a blue-green color. The sample was dried at 100° C. for one hour and then calcined at 300° C. for two hours. 5.41 Grams of a dark gray powder were recovered.

The catalyst was tested according to the procedure described in Example 4. After reaching 213° C., the CO conversion was 44.7% and the methane selectivity was 5.7%. After 1 day at this condition, the CO conversion was 44.2% and the methane selectivity was 5.52%. This example demonstrates that water-assisted low temperature air oxidation is more effective than air calcination for improving the activity of a poorly activated catalyst

EXAMPLE 10

Activation of Catalyst from Example 7 by Aqua Ammonia/Ammonium

Acetate Assisted Aqueous Low Temperature Air Oxidation 5.0 Grams of a sintered metal catalyst from Example 4 was charged to a fixed bed reactor. The catalyst was reduced under a flow of hydrogen (450 cc/mm) at 400° C. for 3 h. The reactor was cooled under the same flow of hydrogen and the gas was replaced with nitrogen. After cooling to room temperature, the catalyst was discharged under a nitrogen atmosphere. A solution was prepared by adding 7.2 grams of glacial acetic acid to approximately 20 grams of deionized water. Then 15.3 grams of ammonium hydroxide (30% $NH_3$) was added, and the solution was diluted to a volume of 50 ml. 0.66 Gram of the solution was added to 2.5 grams of the reduced catalyst. The sample was then placed under an air atmosphere and mixed vigorously for 15 minutes. A mild exotherm occurred which subsided after several minutes. After an additional 2 hours in air, the sample was a blue-green in color. The sample was dried at 100° C. for one hour and then calcined at 300° C. for two hours. 2.6 Grams of a dark gray powder were recovered.

The catalyst was tested according to the procedure described in Example 4. After reaching 213° C., the CO conversion was 60.2% and the methane selectivity was 4.6%. After 1 day at this condition, the CO conversion was 58% and the methane selectivity was 4.8%. This example demonstrates that aqua ammonia/ammonium acetate assisted aqueous low temperature air oxidation outperforms both the water assisted air oxidation and the air calcination for improving the activity of a poorly activated catalyst.

What is claimed is:

1. A process for activating a supported catalyst or supported catalyst precursor, comprising one or more members selected from the group consisting of Co, Ni, Cu, Ru, Rh, Re, Pd, Pt, Os and Ir, the process comprising:
    a) reducing with a hydrogen-containing gas at elevated temperatures so that at least a portion of said at least one metal is in the metallic state;
    b) impregnating under a non-oxidative atmosphere with a solution of at least member selected from the group consisting of ammonium salts, alkyl ammonium salts and weak organic acids, optionally including ammonia;
    c) oxidizing with a gaseous oxidant in the presence of the impregnating solution; and
    d) reducing with a hydrogen-containing gas at elevated temperatures thereby forming an active catalyst.

2. A process in accordance with claim 1, wherein the amount of said at least one member of the impregnating solution in step b) is less than the amount that would be required to convert substantially all of said at least one catalyst metal to its corresponding salts.

3. A process in accordance with claim 1 wherein the ammonium salt or alkyl ammonium salt in the impregnating solution in step b) is selected from the group consisting of nitrate, cyanide, carbonate and carboxylates.

4. A process in accordance with claim 1, wherein the impregnating solution in step b) contains ammonia and the concentration of ammonia is chosen according to the following equation:

$$[NH_3]/(n^-[(NH_4^+)_n X]) \leq 1$$

wherein X is the anion of the salt, n is the charge of the anion of the salt and the bracketed terms are concentrations expressed in moles per liter of the impregnating solution.

5. A process in accordance with claim 1, wherein at least one member in the impregnating solution in step b) is selected from the group consisting of acetic acid, citric acid, succinic acid, malonic acid and formic acid.

6. A process in accordance with claim 1, wherein the amount of said impregnating solution utilized in step b) is from about 10% to 1,000% of the calculated pore volume of the catalyst.

7. A process in accordance with claim 1, wherein the amount of said impregnating solution utilized in step b) is from about 30% to 200% of the calculated pore volume of the catalyst.

8. A process in accordance with claim 1, wherein the gaseous oxidant in step c) is selected from the group consisting of oxygen, air, ozone and nitrogen oxides.

9. A process in accordance with claim 1, wherein the temperature during the oxidation in step c) is maintained below about 100° C.

10. A process in accordance with claim 1, additionally including the step of calcining under an oxidant-containing atmosphere after step c).

11. A process in accordance with claim 1, wherein said catalyst comprises cobalt.

12. A process in accordance with claim 1, wherein said steps b) through d) are repeated.

13. A process in accordance with claim 1, additionally including the step of passivating the catalyst formed in step d) by:
    treatment with a carbon monoxide-containing gas under conditions such that the carbon monoxide is not significantly decomposed; or
    treatment with a gas containing carbon monoxide and hydrogen under conditions such that the carbon monoxide is not significantly hydrogenated.

14. An activated supported metal catalyst for the catalytic hydrogenation of carbon monoxide, said catalyst comprising one or more members selected from the group consisting of Co, Ni, Cu, Ru, Rh, Re, Pd, Pt, Os and Ir, the activity of said catalyst being enhanced by a process comprising:
    a) reducing with a hydrogen-containing gas at elevated temperatures so that at least a portion of said at least one metal is in the metallic state;
    b) impregnating under a non-oxidative atmosphere with a solution of at least member selected from the group consisting of ammonium salts, alkyl ammonium salts and weak organic acids, optionally including ammonia;
    c) oxidizing with a gaseous oxidant in the presence of the impregnating solution; and
    d) reducing with a hydrogen-containing gas at elevated temperatures thereby forming an active catalyst.

15. A catalyst in accordance with claim 14, wherein said catalyst comprises cobalt.

16. A process for producing higher hydrocarbons by the hydrogenation of carbon monoxide by reaction with hydrogen at reaction conditions in the presence of a activated catalyst according to claim 14.

17. A process in accordance with claim 16, wherein at least a portion of the hydrocarbons formed are upgraded to more valuable products by at least one of fractionation and conversion operations.

18. A process for producing higher hydrocarbons by the hydrogenation of carbon monoxide by reaction with hydrogen at reaction conditions in the presence of a activated catalyst according to claim 15.

19. A process in accordance with claim 18, wherein at least a portion of the hydrocarbons formed are upgraded to more valuable products by at least one of fractionation and conversion operations.

* * * * *